(12) United States Patent
Powell

(10) Patent No.: US 7,564,148 B2
(45) Date of Patent: Jul. 21, 2009

(54) UPS HAVING A DUAL-USE BOOST CONVERTER

(75) Inventor: Jeffrey Powell, Lewis Center, OH (US)

(73) Assignee: Libert Corporation, Columbus, OH (US)

( * ) Notice: Subject to any disclaimer, the term of this patent is extended or adjusted under 35 U.S.C. 154(b) by 251 days.

(21) Appl. No.: 11/307,415

(22) Filed: Feb. 6, 2006

(65) Prior Publication Data

US 2006/0175904 A1    Aug. 10, 2006

Related U.S. Application Data

(60) Provisional application No. 60/593,673, filed on Feb. 4, 2005.

(51) Int. Cl.
*H02J 7/00* (2006.01)
(52) U.S. Cl. .................................................. 307/66
(58) Field of Classification Search ............... 307/46, 307/72, 103, 66
See application file for complete search history.

(56) References Cited

U.S. PATENT DOCUMENTS

| 3,971,957 | A | 7/1976 | Hase | |
| 4,104,539 | A | 8/1978 | Hase | |
| 4,340,823 | A | 7/1982 | Miyazawa | 307/66 |
| 4,763,014 | A | 8/1988 | Model et al. | |
| 4,827,151 | A | 5/1989 | Okado | 307/66 |
| 5,006,783 | A | 4/1991 | Corel et al. | |
| 5,200,644 | A | 4/1993 | Kobayashi et al. | 307/66 |
| 5,315,533 | A | 5/1994 | Stich et al. | |
| 5,654,591 | A | 8/1997 | Mabboux et al. | 307/66 |
| 5,867,377 | A | 2/1999 | Suranyi | |
| 5,909,360 | A | 6/1999 | Lavin et al. | |
| 6,134,124 | A * | 10/2000 | Jungreis et al. | 363/34 |
| 6,239,584 | B1 | 5/2001 | Jang | |
| 6,349,044 | B1 | 2/2002 | Canales-Abarca | |
| 6,661,678 | B2 | 12/2003 | Raddi | |
| 2001/0015576 | A1* | 8/2001 | Crosman et al. | 307/66 |
| 2004/0062059 | A1* | 4/2004 | Cheng et al. | 363/17 |

* cited by examiner

*Primary Examiner*—Robert L. Deberadinis
(74) *Attorney, Agent, or Firm*—Locke Lord Bissell & Liddell LLP

(57) ABSTRACT

An uninterruptible power supply (UPS) system includes a rectifier having inputs connectable to an input AC power line to receive AC power therefrom. The output of the rectifier is connected to the input of an inverter. A dual-purpose battery is connected to function as a battery boost when the rectifier is receiving AC power from the AC power line. If the UPS is switched to operate in battery mode, the battery provides input voltage to the inverter when the rectifier is not receiving AC power from the AC power source.

15 Claims, 3 Drawing Sheets

UPS HAVING A DUAL-USE BOOST CONVERTER

CROSS-REFERENCE TO RELATED APPLICATION

This application is a non-provisional application of U.S. Provisional Application No. 60/593,673, filed on Feb. 4, 2005, which is incorporated by reference.

BACKGROUND

The present disclosure relates generally to uninterruptible power supply (UPS) systems, and more particularly, to UPS systems with battery back-ups.

UPS systems are often used to provide continuous power to a load in applications that require continuity of power, such as in hospitals and critical processes in both industrial and commercial settings, protecting equipment from power failure and interference from blackouts, brownouts, surges, and noise. FIG. 1 illustrates portions of a typical UPS system 10. A power supply line 12 is connected to a rectifier 14, which is connected to an inverter 16. A bypass power supply line 18 is connected in parallel with the main supply line 12. A static switch 20 is controlled to switch to the bypass line 18, bypassing the rectifier 14 and inverter 16 if any of those components fail. If the input power fails, a battery module 22 provides DC power to the inverter 16.

Three level battery boost converter topologies are sometimes used in UPS rectifiers. They provide several benefits, including lower component stress—resulting in increased reliability, less switches losses—resulting in greater efficiency and less heat rejected into the environs, and the ability to provide utility power-factor correction. However, battery boost converters add expense and complexity to UPS systems.

The present application addresses shortcomings associated with the prior art.

SUMMARY

An uninterruptible power supply (UPS) system includes a rectifier having inputs connectable to an input AC power line to receive AC power therefrom. The output of the rectifier is connected to the input of an inverter. A dual-purpose battery is connected to function as a battery boost when the rectifier is receiving AC power from the AC power line. If the UPS is switched to operate in battery mode, the battery provides input voltage to the inverter when the rectifier is not receiving AC power from the AC power source.

BRIEF DESCRIPTION OF THE DRAWINGS

Other objects and advantages of the invention will become apparent upon reading the following detailed description and upon reference to the drawings in which.

Figure 1:
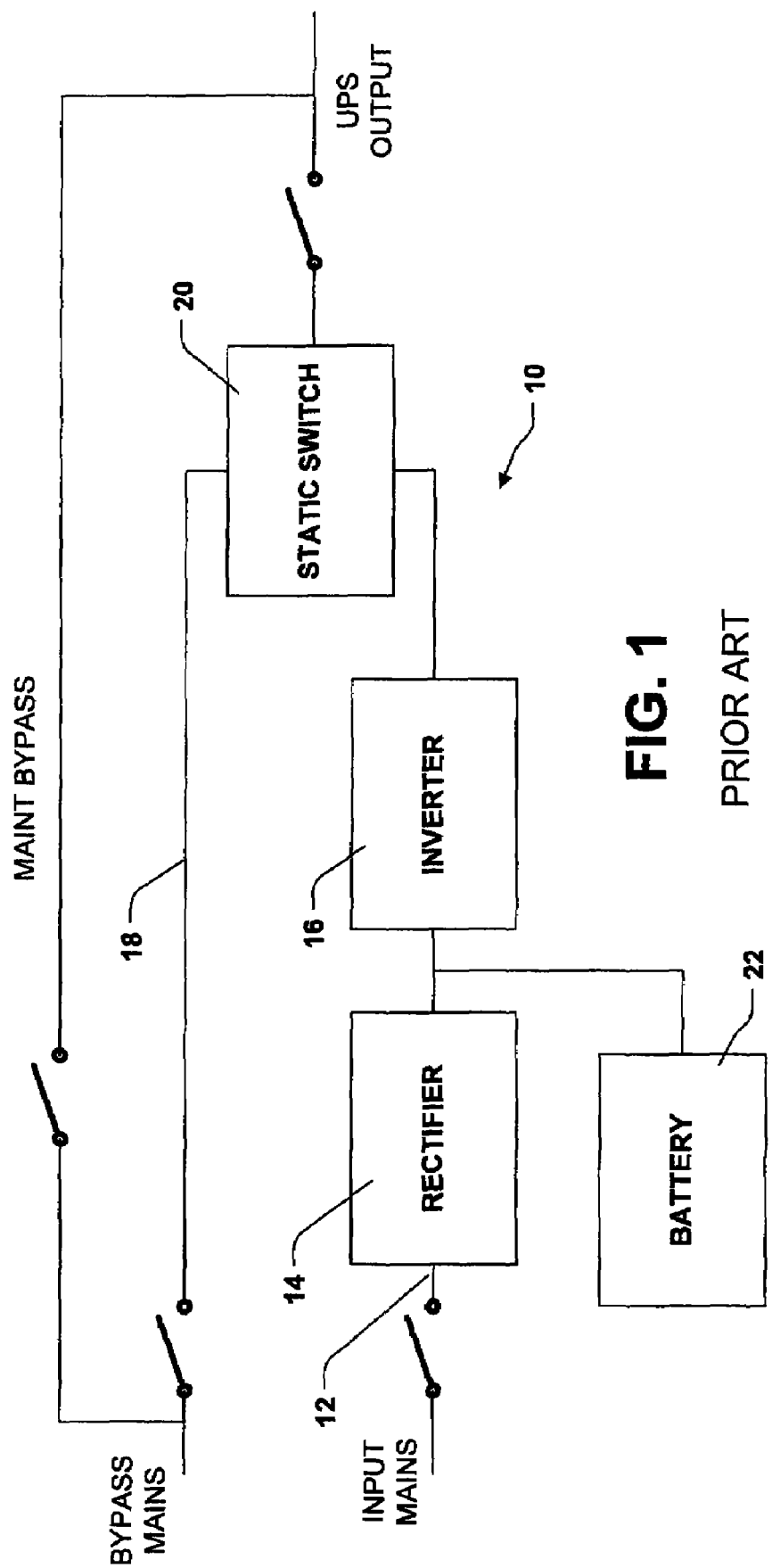
FIG. 1 is a block diagram of portions of a UPS module.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The use of a three-level battery boost converter in a UPS rectifier is attractive for many reasons, as noted above. If, for example, the input AC power fails, the UPS system operates on battery power. During battery operation, the rectifier is unused since the AC line is not being rectified for energy input, while during discharge the inverter will benefit from battery voltage boosting and regulation.

In accordance with the teachings herein, a connection arrangement is provided that allows dual use of the boost converter part of the three-level converter. The converter batteries provide the power for the three level boost converter during normal operation of the rectifier and inverter. If the UPS switches to battery mode, the rectifier is not used so the battery boost is also unused. Thus, the same batteries also provide the substitute battery voltage for the utility line voltage when operated in this fashion. This arrangement eliminates the need for the expensive battery boost converter.

Figure 2:
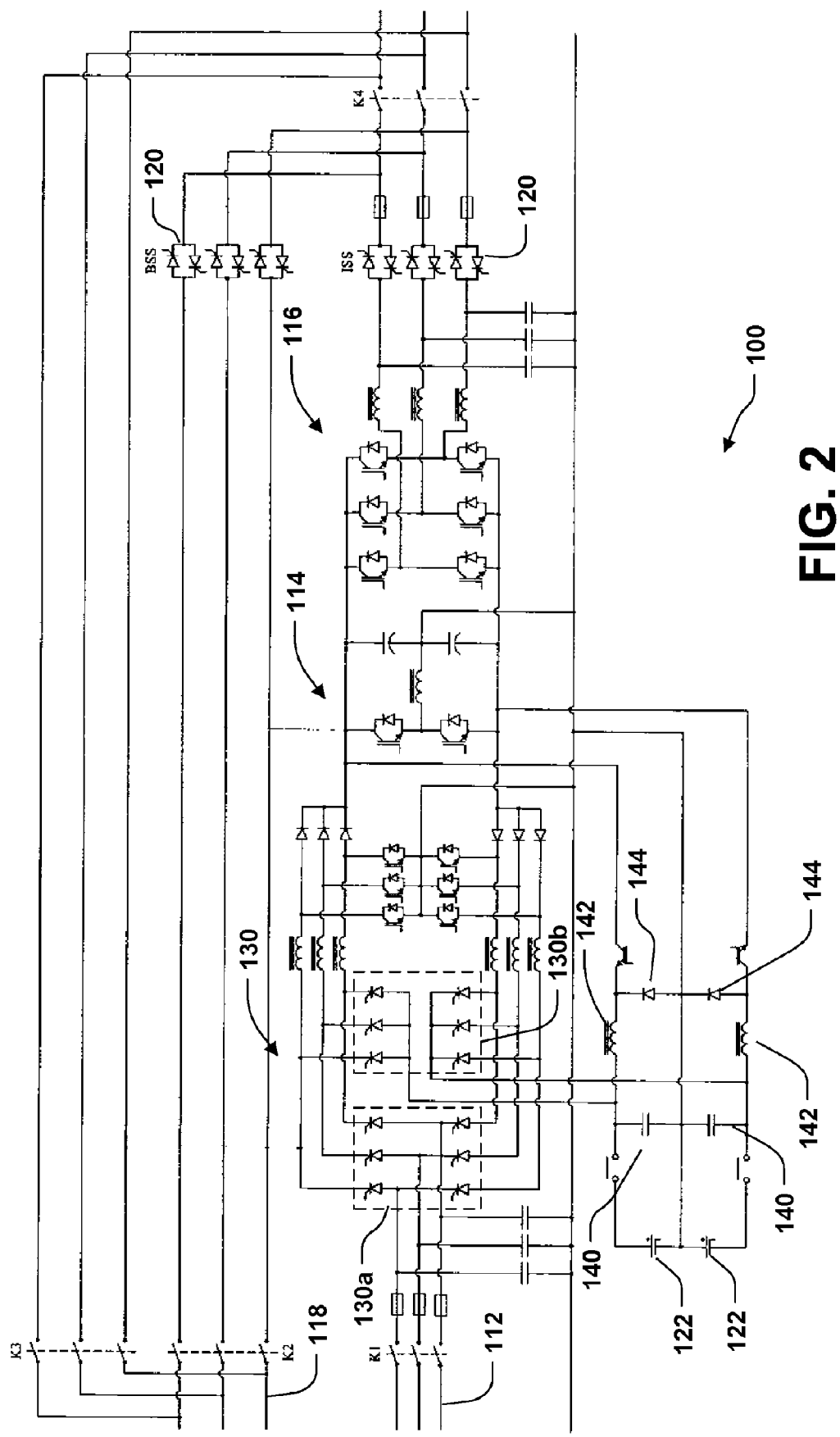
FIG. 2 is a schematic diagram of portions of a UPS system in accordance with the teachings of the present disclosure.

FIG. 2 illustrates a three-phase UPS system 100 in accordance with certain teachings of the present disclosure. The UPS system 100 includes power supply lines 112 and bypass power supply lines 118. The main power lines 112 are connected to a rectifier/boost converter 114 via a group of switches 130. In the illustrated embodiment, the switches 130 are thyristors. The rectifier 114 is connected to an inverter 116 having outputs connected to static switches 120. The static switches 120 are controlled to switch to the bypass line 118, bypassing the rectifier 114 and inverter 116 if any of those components fail. If the input power fails, batteries 122 provide DC power to the inverter 116.

Figure 3:
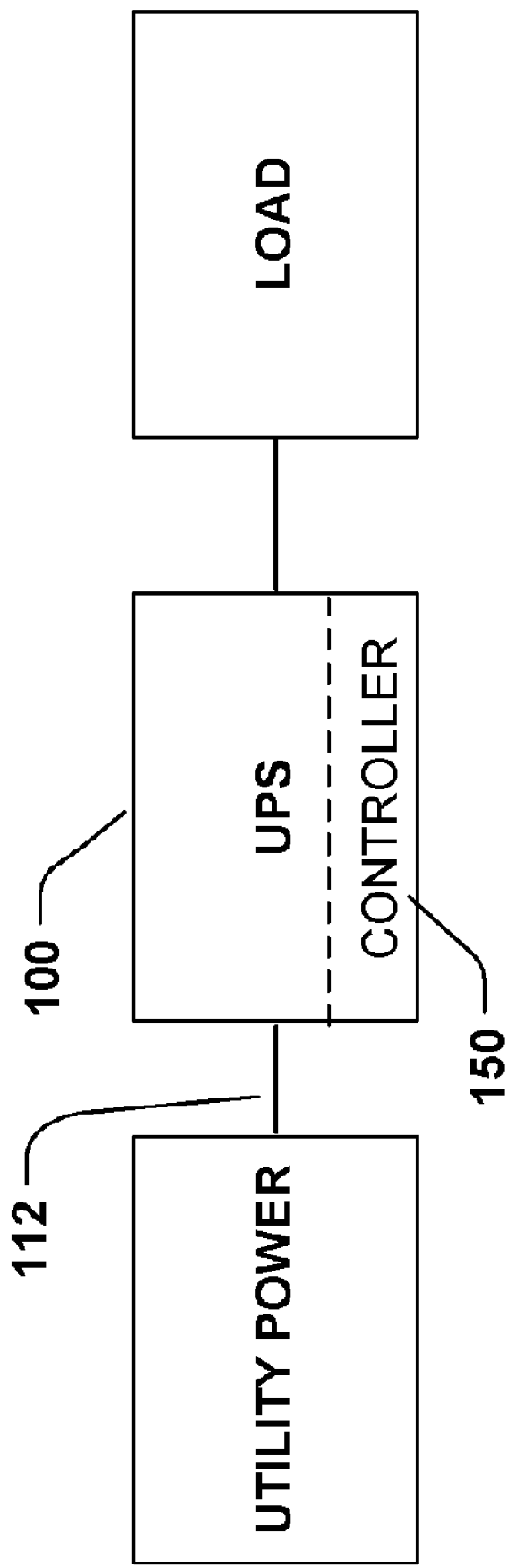
FIG. 3 is a block diagram illustrating additional aspects of a UPS system in accordance with the teachings of the present disclosure.

As shown in the exemplary three-phase UPS system of FIG. 2, the 12 thyristors 130 function as switches and are arranged to interconnect either the three-phase utility line 112 or the battery 122 to the rectifier. The six thyristors 130a connected to the utility line 112 would normally be used in a three-level converter. In addition to selectively connecting the utility line 112 to the rectifier 114, they provide an additional benefit of implementing a soft-start up for the UPS system and also provide a utility disconnect feature. The other six thyristors 130b function as switches that are turned on if the input power 112 fails. When the thyristors 130b are turned on, the batteries 122 are connected to provide a DC input to the boost converter/rectifier 114. The network comprising capacitors 140, inductors 142 and diodes 144 functions as a batter charger. As shown in the block diagram of FIG. 3, the UPS system 100 further includes a controller 150 that controls operation of the static switches 120 and the switching arrangement 130.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A UPS system, comprising:
   a rectifier having inputs connectable to an input AC power source;
   an inverter connected to the rectifier;
   a battery connected to function as part of a battery boost converter when the rectifier is receiving AC power from the AC power source, and to provide input voltage to the inverter when the rectifier is not receiving AC power from the AC power source.

2. The UPS system of claim 1, further comprising a switching arrangement for selectively switching the battery between functioning as the battery boost converter and providing input voltage to the inverter.

3. The UPS system of claim 2, wherein the switching arrangement includes thyristers.

4. The UPS system of claim 2, wherein the switches are activated in response to losing the AC power source.

5. The UPS system of claim 1, wherein the UPS system is a three-phase system.

6. The UPS system of claim 1, wherein the battery is simultaneously connected to the rectifier and the inverter.

7. The UPS system of claim 1, wherein the boost converter is functional both when the rectifier is receiving AC power from the AC power source and when the rectifier is not receiving AC power from the AC power source.

8. The UPS system of claim 1, wherein the rectifier and the inverter are independently operable and substantially continuously connected to each other.

9. The UPS system of claim 1, wherein the battery functions as part of the battery boost converter to provide input voltage to the inverter when the rectifier is receiving AC power from the AC power source.

10. A method of operating a UPS system, comprising:
    connecting a battery to a rectifier to function as a battery boost converter when the rectifier is receiving AC power from an AC power source and connecting the battery to function as a back up power source when the rectifier is not receiving AC power from the AC power source.

11. The method of claim 10, wherein connecting the battery to function as a back up power source includes activating a switch in response to loss of the AC power source.

12. The method of claim 10, wherein the battery functions as part of the battery boost converter to provide input voltage to an inverter when the rectifier is receiving AC power from the AC power source.

13. A UPS system, comprising:
    a three-phase rectifier having inputs connectable to an input AC power source;
    a battery connected the rectifier such that together they function as a boost converter when the rectifier is receiving AC power from the AC power source;
    a three-phase inverter connected to the rectifier; and
    wherein the battery is further operable to provide input voltage to the inverter when the rectifier is not receiving AC power from the AC power source.

14. The UPS system of claim 13, further comprising a switching arrangement for selectively switching the battery between functioning as the boost converter and providing input voltage to the inverter.

15. The UPS system of claim 13, wherein the battery functions as part of the battery boost converter to provide input voltage to the inverter when the rectifier is receiving AC power from the AC power source.

* * * * *

UNITED STATES PATENT AND TRADEMARK OFFICE
CERTIFICATE OF CORRECTION

PATENT NO. : 7,564,148 B2 Page 1 of 1
APPLICATION NO. : 11/307415
DATED : July 21, 2009
INVENTOR(S) : Jeffrey Powell It is certified that error appears in the above-identified patent and that said Letters Patent is hereby corrected as shown below:

On the Title Page, Item (73) on the cover page the Assignee "Libert Corporation" should be changed to "Liebert Corporation"

Signed and Sealed this

First Day of September, 2009

David J. Kappos
*Director of the United States Patent and Trademark Office*